United States Patent [19]

Miller

[11] Patent Number: 5,071,046

[45] Date of Patent: Dec. 10, 1991

[54] BICYCLE ATTACHED VALISE

[76] Inventor: Glenn L. Miller, 441 Del Paso Blvd., #27, Sacramento, Calif. 95815

[21] Appl. No.: 491,079

[22] Filed: Mar. 9, 1990

[51] Int. Cl.$^5$ .............................. A45F 4/00; B62J 9/00
[52] U.S. Cl. ...................................... 224/151; 224/31; 224/35; 224/205
[58] Field of Search ................... 224/31, 32 R, 35, 36, 224/151, 202, 205, 206, 207, 224, 226, 249, 916; 150/107, 110, 127, 128

[56] References Cited

U.S. PATENT DOCUMENTS

| | | | |
|---|---|---|---|
| 444,642 | 1/1891 | Allen et al. | 224/35 |
| 522,186 | 7/1894 | Andrews | 224/35 |
| 576,832 | 2/1897 | Bender et al. | 224/35 |
| 590,936 | 9/1897 | Perkins | 224/35 |
| 605,038 | 5/1898 | Wirt | 224/35 |
| 614,005 | 11/1898 | Keeler | 224/35 |
| 618,612 | 1/1899 | Parsons | 224/35 |
| 2,552,443 | 5/1951 | Molinari | 224/30 R |
| 3,837,546 | 9/1974 | Westermann | 224/35 |
| 4,720,027 | 1/1988 | Board | 224/35 |

FOREIGN PATENT DOCUMENTS

| | | | |
|---|---|---|---|
| 300278 | 8/1917 | Fed. Rep. of Germany | 224/35 |
| 1355740 | 2/1964 | France | 150/110 |
| 5836 | of 1897 | United Kingdom | 224/35 |
| 23741 | of 1897 | United Kingdom | 224/35 |

Primary Examiner—Henry J. Recla
Assistant Examiner—Robert M. Fetsuga
Attorney, Agent, or Firm—Bernhard Kreten

[57] ABSTRACT

A valise for use primarily with a land vehicle such as a velocipede having an external contour complemental to a bicycle frame defined by an area between the seat, the front fork and the crank area. Fastening instrumentalities extend between the valise and the frame for positive support. The valise readily separates from the velocipede for subsequent transport by the rider apart from the velocipede for security.

19 Claims, 2 Drawing Sheets

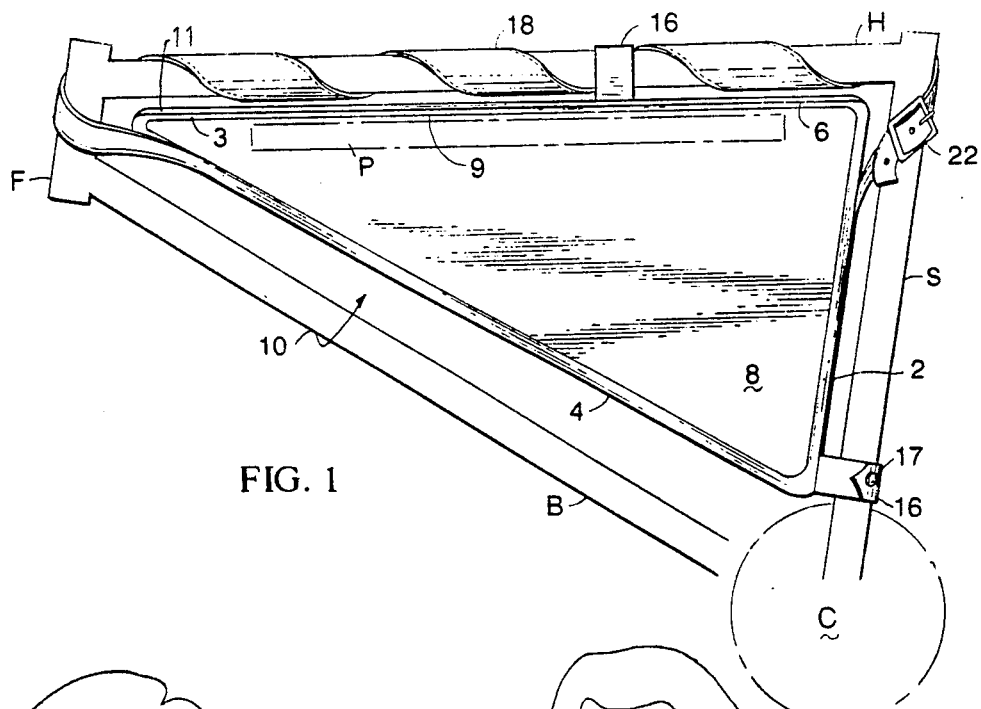
FIG. 1
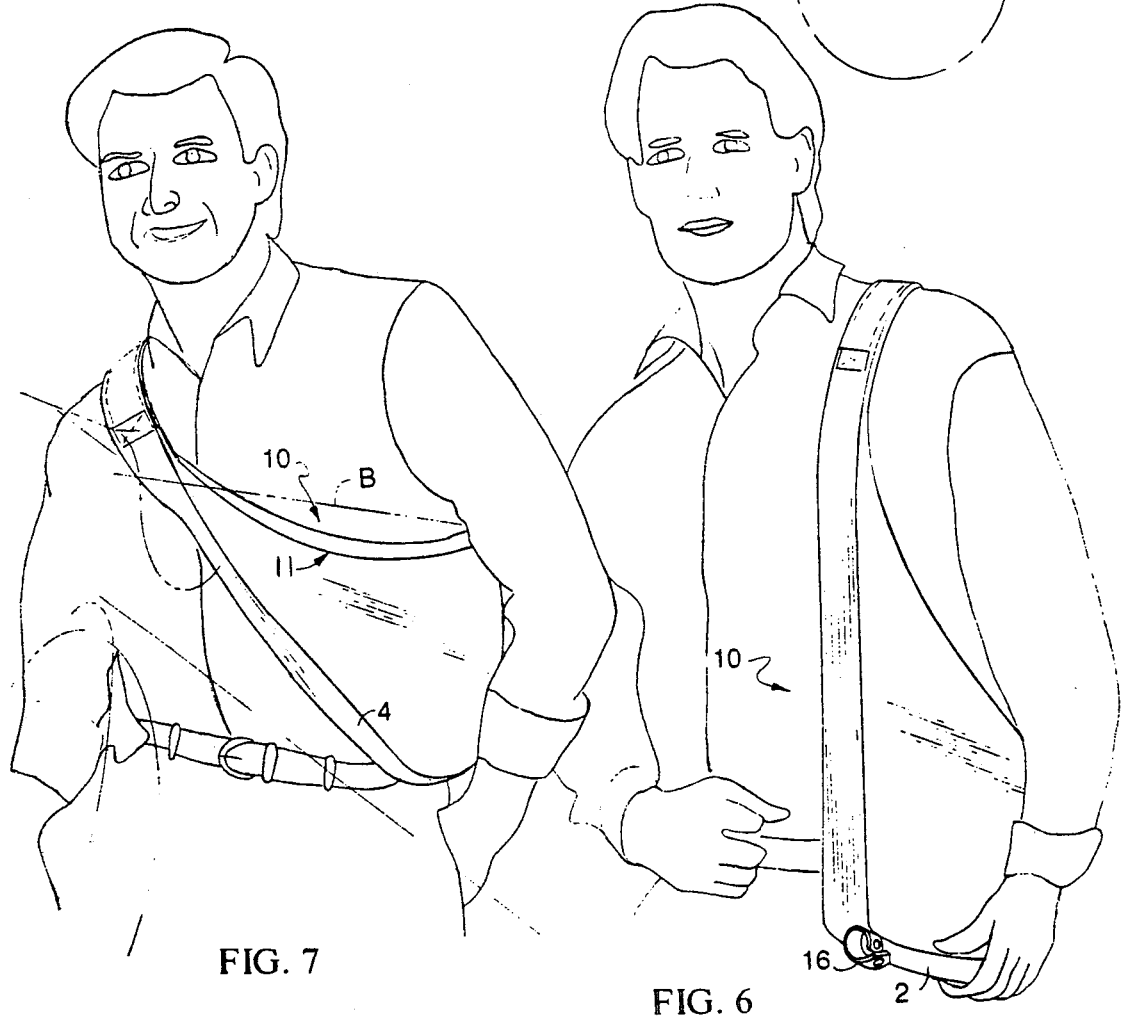
FIG. 7
FIG. 6

BICYCLE ATTACHED VALISE

FIELD OF THE INVENTION

The following invention relates generally to containers within which articles are adapted to reside. The container has an exterior contour which lends itself to ease in transport. More specifically, the instant invention is directed to a valise formed from flexible material such as leather or the like which includes a strap which can be attached on a bicycle, worn over the shoulder or carried in another manner to add a new dimension to bicycle accessories.

BACKGROUND OF THE INVENTION

Devices that attach to bicycles which increase their ability to transport articles are generally broken down into two categories: those rigid containers which are adapted and intended to remain with the bicycle, and flexible containers which mount on specially fabricated form work or hardware and can be removably attached.

While both of these types of structures serve their intended function, both are relatively limited in their use and adaptability to be utilized in other environments.

One serious problem associated with bicycles today is the penchant for thieves, vandals, etc. to appropriate either the entire bicycle or certain components thereof. By way of contrast, the instant invention is readily removable from the bicycle, and once removed provides an attractive piece of personal luggage.

While some prior art devices are removable from the bicycle, they may be awkward to remove, install or they are unsightly to transport by the pedestrian. The instant invention shares none of those difficulties.

SUMMARY OF THE INVENTION

By way of contrast, the instant invention in its essence provides a valise having a substantially triangular shape which lends itself to placement between the seat and the handle bars, within the substantially triangular area of the bicycle frame. This makes the valise accessible even while using the bicycle as a vehicle.

The valise includes first, second and third edge walls oriented in the shape of a triangle which are interconnected with side walls interconnecting these edge walls. Thus, a three dimensional somewhat triangular shaped valise has been provided. One edge wall is provided with a zipper along its length and at one end thereof a hole is provided to receive certain accessories common to bicycling, such as a bicycle pump.

Frame supports are adapted to extend between the valise and structural members of the bicycle for reliable transport. In addition, a strap is provided which facilitates transport of the valise by a person, when the person is a pedestrian, and also allows the valise to be reliably attached to the bicycle frame by looping a portion of the strap around the bicycle frame thereby affixing the valise to the frame.

OBJECTS OF THE INVENTION

Accordingly, it is a primary object of the present invention to provide a novel and useful valise particularly adapted for use with land vehicles, such as bicycles.

A further object of the present invention is to provide a device as characterized above which is extremely durable in construction, safe to use and lends itself to mass production techniques.

A further object of the present invention involves providing a device as characterized above wherein the material from which the valise is made is aesthetically pleasing so that its subsequent use as a shoulder bag or other article of apparel is not objectionable.

A further object of the present invention is to provide a device as characterized above which is safely placed on the bicycle without having to add special mounting hardware to support the device.

A further object of the present invention is to provide a device as characterized above, wherein once deployed on the bicycle the valise is oriented such that its contents and interior are accessible to the rider while riding the bicycle.

A further object of the present invention is to provide a device as characterized above which has been configured for extended use both when carried on a bicycle and by a person. Thus, the device is comfortable to carry.

Viewed from one vantage point, it is a further object of the present invention to provide a valise for attachment either to a bicycle or a person formed from flexible material defining a container having edge walls oriented to circumscribe a pair of spaced substantially triangular side walls, a closure fastener on one said edge wall allowing access to an interior of said valise, means to tether said valise to either the person or the bicycle and means to support the valise on a frame of the bicycle between its handle bars and seat.

Viewed from a second vantage point, it is an object of the present invention to provide a valise which attaches to a bicycle which is formed from a walled container having side walls and edge walls. The edge walls are oriented to parallel those portions of a bicycle frame which extend between a bicycle seat and the handle bars and above and between a pedal crank area. Fastening means extend between the container and the bicycle frame. These fastening means are removably attached to the frame to allow subsequent use of the valise apart from the use of the bicycle.

Viewed from a third vantage point, it is an object of the present invention to form a valise which is adapted to be carried either by a person or a velocipede, the steps including: forming a valise from a plurality of panels having spaced parallel side walls, the space between the side walls determined by a circumscribing edge wall, forming the circumscribing wall to parallel the frame components of a bicycle, stitching together the side wall and peripheral edge walls, and attaching the valise to the frame via a strap which doubles both as an attachment of the valise to the bicycle and serves as a shoulder strap for carrying the valise apart from the bicycle, and further fastening the valise to the bicycle.

These and other objects will be made manifest when considering the following detailed specification when taken in conjunction with the appended drawing figures.

DESCRIPTION OF THE DRAWING FIGURES

FIG. 1 is a side view of the apparatus according to the present invention in its preferred environment.

Figure 5:
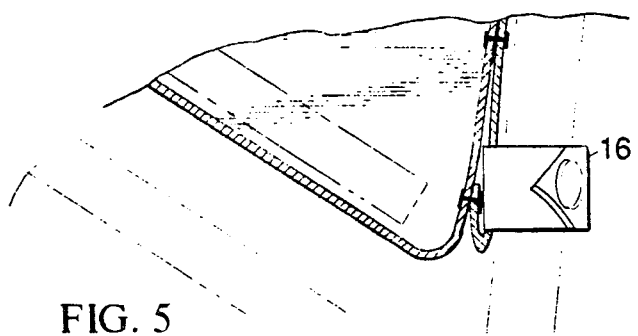

FIG. 5 a further fragmentary view exhibiting other structure.

FIG. 6 shows the apparatus according to the present invention carried apart from the intended operative association with the bicycle.

FIG. 7 shows an alternative carrying methodology.

BRIEF DESCRIPTION OF THE PREFERRED EMBODIMENT

Considering the drawings now, wherein like reference numerals indicate like parts throughout the various drawing figures, reference numeral 10 is directed to the valise according to the present invention.

In its essence, the valise 10 is a substantially triangular shaped container which includes an adjustable strap 18, frame supports 16 for attaching the valise to various portions on a bicycle, and a zipper 14 allowing access to the interior of the valise.

More specifically, the valise 10 has a configuration substantially that of a triangle and more specifically of a right triangle. It is formed with a pair of spaced parallel side walls 8 each having a substantially triangular configuration and a peripheral set of edge walls 2, 4 and 6 circumscribing the side walls 8 to provide a valise defining a container having an interior.

More specifically, the edge walls include a first edge wall 2 defining a base, a second edge wall 4 defining the length of the valise, and a third edge wall 6 defining the hypotenuse of the triangular shaped valise 10. Preferably, the edge walls 2, 4 and 6 are all formed from a single strip of material with one end 3 of the strip ending near a front fork F of the bicycle B.

Access to the interior of the valise is afforded by means of a fastener such as a zipper 14 disposed on the third wall 6. The zipper 14 is commercially available and includes material 14a, b on sides of the actual zipper to fasten to the wall 6 which in turn fastens to walls 8. In effect one edge border 5 of third wall 6 supports the zipper along one side 14a of the material holding the zipper. An opposite side 14b of the material holding the zipper connects to a top portion 9 of side wall 8. Thus, the strip of material 14a, b with the zipper closes and completes the third wall 6. Optionally, a flap 11 (FIGS. 4 and 7) may overlie and occlude the zipper for aesthetic enchancement.

In addition, a hole 12 is provided at the conjunction of the third wall 6 and the second wall 4. As shown, this hole 12 is used to receive therewithin an elongate cylindrical object which is the common configuration of a bicycle pump. This is diagrammatically depicted at P in the drawings.

FIG. 1 reflects certain details pertaining to the means for fastening the valise 10 to a vehicle, more particularly the frame of a bicycle. As shown in FIG. 1, a bicycle frame is depicted having the front fork receiving area F, a rearwardly disposed seat supporting area S, a lower crank area C, and a horizontal member H extending between the fork area F and the seat support S as well as a base frame member B extending between the crank C and the fork frame F. This is the traditional configuration for most bicycles and defines the bicycle support area upon which the valise 10 is to be appended.

More particularly the valise 10 includes an elongate strap 18 which extends from two apices of the triangularly shaped valise 10. Preferably, the strap 18 is a continuation of all the edge walls and extends from edge wall 4. Attachment by the strap 18 to the bicycle is afforded by a free end of the second wall 4. As shown, the confluence of the base wall 2 and the third wall 6 determines the area of attachment of the free end of the strap 18. This includes a buckle 22 which adjusts the length of the strap 18.

For deployment on the bicycle, the valise 10 is oriented such that its base wall 2 parallels the seat support S, the second edge wall 4 parallels the base frame member B and the third edge wall 6 parallels the horizontal frame member H. Thusly, configured, the shoulder strap 18 may then be wrapped around the frame in the following manner: an initial wrap is placed around the front fork support F, and optionally a plurality of wraps of the strap 18 overlie the horizontal frame H. Preferably, three wraps are made.

Figures 3, 4:
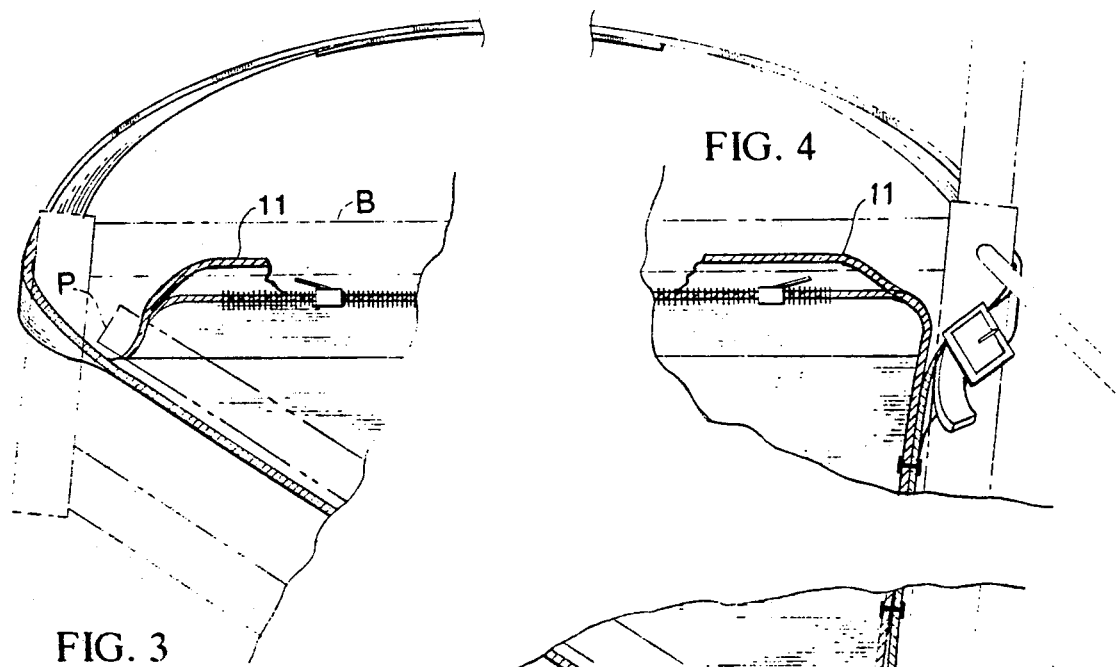
FIG. 3 is a fragmentary sectional view showing certain structural details of the apparatus according to the present invention.
FIG. 4 is a view similar to FIG. 3 showing a further portion.

Alternatively, the strap 18 may extend rearwardly with no wraps as suggested in FIGS. 3-5. A free end of the strap 18, remote from the fork area F, loops around the seat support S and thereafter affixes to the buckle 22 of the strap 18 adjacent the base wall 2. Note the buckle attaches to the side wall 2 preferably with a rivet. FIG. 7 shows the bicycle B carried when the strap 18 is configured as in FIGS. 3-5. Note padding 20 on strap 18 provides comfort to the person.

Thus, in use and operation, when deployed on a bicycle, the zipper 14 immediately underlies (and preferably is just off set from) the horizontal bar H. This allows access by the rider to the interior and therefore the contents of valise 10 by manipulation of the zipper 14 along the direction of the double ended arrows A.

Figure 2:
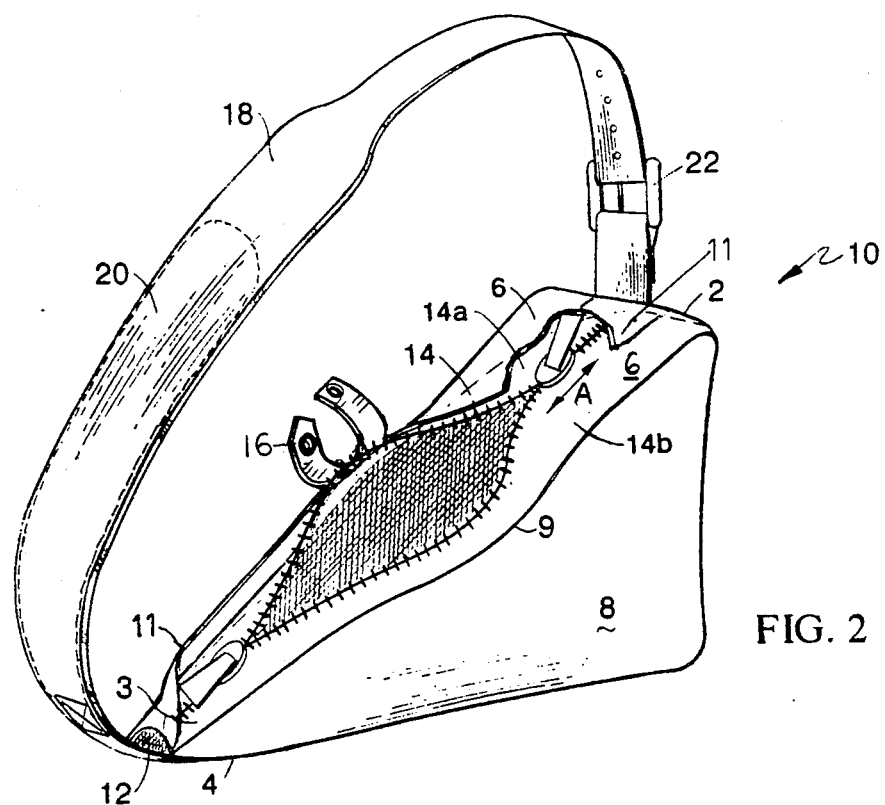
FIG. 2 is a perspective view of that which is shown in FIG. 1 removed from the preferred environment of a bicycle.

Further support for the valise is afforded between the bicycle frame and the valise by means of a plurality of frame supports 16 strategically deployed (as by sewing or gluing etc.) around the periphery of the valise, extending from edge walls thereof. In the case where the flap 11 is provided, the support 16 may attach to an exposed surface thereof as shown in FIG. 1 or 2. As shown in FIG. 1, for example, a frame support 16 formed as a loop of material capable of coupling and uncoupling using a fastening area such as snap 17 allows the frame support 16 to circumscribe the appropriate portion of the frame.

One particularly desirable attribute of the instant invention involves the facility with which the valise 10 can be removed from the bicycle for subsequent transport by the rider. Thus, the security of the device will have been enhanced. thereby and the valise itself is suitably tailored to provide an attractive accompaniment with and for the rider for storage of articles.

Moreover, having thus described the invention, it should be apparent that numerous structural modifications and adaptations may be resorted to without departing from the scope and the fair meaning of the instant application as set forth hereinabove and defined hereinbelow by the claims.

I claim:

1. A valise for transportation by both a bicycle of the type having a frame which includes a front fork support for handle bars, a pedal crank area, and a bicycle seat and a person, comprising, in combination: said valise formed from flexible material and defining a container having a pair of spaced, parallel substantially triangular side walls each having an outboard periphery and edge walls oriented to circumscribe said side walls by attachment to said side walls at said outboard peripheries of said side walls, one said edge wall having an elongated slit therethrough,
- a fastener on said one said edge wall allowing access to an interior of said valise through said slit by moving said fastener from a closed to an open position,
- means to tether said valise to either the person or the bicycle, said tethering means formed on said valise,
- and means to support said valise on the frame of the bicycle between the handle bars and the seat, said support means formed on said valise.

2. The valise of claim 1 wherein said fastener supporting edge wall is oriented in substantially horizontal plane, such that when attached to the bicycle said fastener supporting edge wall underlies a horizontal bar extending between the front fork support of the bicycle and said seat of the bicycle.

3. The valise of claim 2 wherein said tethering means includes a strap of material integrally formed with another said edge wall extending outwardly therefrom, said tethering means having a free end which communicates with a buckle supported on a remaining said edge wall for attachment thereto.

4. The valise of claim 3 wherein said support means includes a band of material having terminal portions, said band secured to said remaining edge wall and adapted to gird a portion of the bicycle,
- and a snap fastener at said terminal portions of said support means to secure said valise to the bicycle.

5. The valise of claim 4 wherein a single continuous strip of material is used to form said edge walls and said supporting strap.

6. The valise of claim 4 wherein said fastener which allows access to an interior of said valise is a zipper fastener and includes two strips of material one on each side of said zipper fastener, one said strip of material is fastened to said one said edge wall and the other said strip of material is fastened to said periphery of one said triangular side wall.

7. A valise for attachment to a bicycle of the type having a frame which includes a front fork support for handle bars, a pedal crank area, and a bicycle seat, comprising, in combination:
- said valise is formed from a walled container having side walls and edge walls, said edge walls are formed from a continuous strip of material and are oriented to parallel portions of the bicycle frame which extend between the bicycle seat and the handle bars and above and between the pedal crank area, support means adapted to extend between said container and the bicycle frame, said support means adapted to be removably attached to the frame to allow subsequent use of the valise apart from the use of the bicycle,
- a fastener on and passing through a first said edge wall allowing access to the interior of said valise, said first edge wall is oriented in a substantially horizontal plane, such that when attached to the bicycle said first edge wall underlies a horizontal bar extending between the front fork of the bicycle and the seat of the bicycle,
- means to tether said valise to either a person or the bicycle, said tethering means includes a strap of material integrally formed with a second said edge wall and extending outwardly therefrom, said tethering means having a free end which communicates with a buckle supported on a third said edge wall for attachment thereto.

8. The valise of claim 7 wherein said support means includes a band of material having terminal portions, said band secured to said third edge wall and adapted to gird a portion of the bicycle,
- and a snap fastener at said terminal portions of said support means to secure said valise to the bicycle.

9. The valise of claim 8 wherein a single continuous strip of material is used to form said edge walls and said tether means strap.

10. The valise of claim 9 wherein said fastener which allows access to an interior of said valise is a zipper fastener and includes two strips of material one on each side of said zipper fastener, one said strip of material is fastened to said first edge wall and the other said strip of material is fastened to said periphery of one said side wall.

11. The valise of claim 10 including a flap which overlies said fastener, occluding the fastener from view.

12. A method for increasing the payload of a land vehicle such as a velocipede having a frame, the steps including:
- forming a valise with a pair of spaced parallel side walls, circumscribing the spaced parallel side walls with a peripheral edge wall,
- tailoring both the side walls and the edge walls to parallel a contour of the frame defined by an expanse between a front fork, a seat area and above a pedal crank area of the frame,
- providing an access portal into the valise,
- orienting the access portal on a topmost area of said valise for access by the rider,
- removably attaching the valise to the frame,
- whereby the valise may be subsequently removed from the velocipede and transported independent of the vehicle,
- including forming the peripheral edge wall from a unitary band of material, and allowing a free end of the edge wall to extend beyond said valise, thereby forming a tethering strap which re-attaches to the valise,
- and providing a buckle on the valise for attachment of the tethering strap to the valise.

13. The method of claim 12 including forming the access portal by sewing a zipper between one edge wall and a periphery of one side wall.

14. The method of claim 13 including forming a flap over the edge that connects the zipper to the side wall, occluding the zipper.

15. A valise for transportation by both a person and a bicycle of the type having a frame which includes a fork support for handle bars, a pedal crank area, and a bicycle seat, comprising, in combination: said valise formed from flexible material and defining a container having a pair of spaced, parallel substantially triangular side walls each having an outboard periphery and edge walls oriented to circumscribe said side walls by interposition of said edge walls between said side walls at said outboard peripheries of said side walls,
- a fastener on and passing through one said edge wall allowing access to an interior of said valise by moving said fastener from a closed to an open position,
- means to tether said valise to either the person or the bicycle, said tethering means formed on said valise, means to support said valise on the frame of the bicycle between the handle bars and the seat, said support means formed on said valise, said fastener is disposed upon said one said edge wall which is oriented in a substantially horizontal plane, such that when attached to the bicycle said fastener disposed edge wall underlies a horizontal bar extending between the fork support of the bicycle and the seat of the bicycle, said tethering means includes a strap of material integrally formed with another said edge wall and extending outwardly therefrom, said tethering means having a free end which communicates with a buckle supported on a remaining said edge wall for attachment thereto, said support means includes a band of material having terminal portions, said band secured to said remaining edge wall and adapted to gird a portion of the bicycle, a snap fastener at said terminal portions of said support means to secure said valise to the bicycle, wherein a single continuous strip of material is used to form said edge walls and said tethering strap.

16. A valise for transportation by both a person and a bicycle of the type having a frame which includes a fork support for handle bars, a pedal crank area, and a bicycle seat, comprising, in combination: said valise formed from flexible material and defining a container having a pair of spaced, parallel substantially triangular side walls each having an outboard periphery and edge walls oriented to circumscribe said side walls by interposition between said side walls at said outboard peripheries of said side walls, a fastener on and passing through one said edge wall allowing access to an interior of said valise by moving said fastener from a closed to an open position, means to tether said valise to either the person or the bicycle, said tethering means formed on said valise, means to support said valise on the frame of the bicycle between the handle bars and the seat, said support means formed on said valise, wherein a single continuous strip of material is used to form said edge walls and said tethering means.

17. A valise for attachment to a bicycle of the type having a frame which includes a fork support for handle bars, a pedal crank area, and a bicycle seat, comprising, in combination:

said valise is formed from a walled container having side walls and edge walls, said edge walls are oriented to parallel portions of the bicycle frame which extend between the bicycle seat and the handle bars and above and between the pedal crank area, support means adapted to extend between said valise and the bicycle frame, said support means adapted to be removably attachable to the frame to allow subsequent use of the valise apart from the use of the bicycle, means to tether said valise to either a person or the bicycle, a zipper-type fastener on a first said edge wall allowing access to the interior or said valise, wherein said fastener disposed on said first edge wall is oriented in a substantially horizontal plane, such that when attached to the bicycle said fastener disposed on said first edge wall underlies a horizontal bar extending between the fork of the bicycle and the seat of the bicycle, wherein said tethering means includes a strap of material integrally formed with a second said edge wall and extending outwardly therefrom, said tethering means having a free end which communicates with a buckle supported on a third said edge wall for attachment thereto, wherein said support means includes a band of material having terminal portions, said band secured to said third edge wall and adapted to gird a portion of the bicycle, a snap fastener at said terminal portions of said support means to secure said valise to the bicycle, wherein a single continuous strip of material is used to form said edge walls and said tethering strap.

18. A valise for attachment to a bicycle of the type having a frame which includes a fork support for handle bars, a pedal crank area, and a bicycle seat, comprising, in combination:

said valise is formed from a walled container having side walls and edge walls, said edge walls are oriented to parallel portions of the bicycle frame which extend between the bicycle seat and the handle bars and above and between the pedal crank area, support means adapted to extend between said container and the bicycle frame, said support means adapted to be removably attachable to the frame to allow subsequent use of the valise apart from the use of the bicycle, a zipper fastener on one said edge wall allowing access to the interior of said valise, wherein said zipper fastener which allows access to an interior of said valise includes two strips of material one on each side of said zipper fastener, one said strip of material is fastened to said one said edge wall and the other said strip of material is fastened to a periphery of one said side wall.

19. A valise for attachment to a bicycle of the type having a frame which includes a fork support for handle bars, a pedal crank area, and a bicycle seat, comprising, in combination:

said valise is formed from a walled container having side walls and edge walls, said edge walls are oriented to parallel portions of the bicycle frame which extend between the bicycle seat and the handle bars and above and between the pedal crank area, support means adapted to extend between said container and the bicycle frame, said support means adapted to be removably attachable to the frame to allow subsequent use of the valise apart from the use of the bicycle, means to tether said valise to either a person or the bicycle, wherein said tethering means includes a strap of material integrally formed with one said edge wall extending outwardly therefrom, said tethering means having a free end which communicates with a buckle supported on another said edge wall for attachment thereto, wherein a single continuous strip of material is used to form said edge walls and said tethering strap.

* * * * *